United States Patent [19]
Gulick

[11] Patent Number: 6,032,213
[45] Date of Patent: Feb. 29, 2000

[54] PC CORE LOGIC CHIPSET COMPRISING A SERIAL REGISTER ACCESS BUS

[75] Inventor: Dale E. Gulick, Austin, Tex.

[73] Assignee: Advanced Micro Devices, Inc., Sunnyvale, Calif.

[21] Appl. No.: 08/928,035

[22] Filed: Sep. 11, 1997

[51] Int. Cl.[7] ............................. G06F 13/00; G06F 13/42
[52] U.S. Cl. .............................. 710/129; 710/2; 710/22; 710/28; 710/100; 710/126; 710/260; 710/266; 712/38; 713/502
[58] Field of Search ...................................... 710/101, 129, 710/130, 2, 28, 100, 260, 266, 48, 22, 61, 126, 105, 106; 712/38, 40; 713/400, 502

[56] References Cited

U.S. PATENT DOCUMENTS

| | | | |
|---|---|---|---|
| 4,683,530 | 7/1987 | Quatse | 710/2 |
| 4,885,538 | 12/1989 | Hoenniger, III et al. | 324/312 |
| 5,410,542 | 4/1995 | Gerbehy et al. | 370/85.1 |
| 5,634,069 | 5/1997 | Hicok et al. | 710/33 |
| 5,740,387 | 4/1998 | Lambrecht et al. | 710/129 |
| 5,778,199 | 7/1998 | Wanner et al. | 710/107 |
| 5,790,831 | 8/1998 | Lin et al. | 395/500 |
| 5,799,208 | 8/1998 | Hwang et al. | 710/38 |
| 5,822,548 | 10/1998 | Story et al. | 710/106 |
| 5,822,554 | 10/1998 | Conway | 710/129 |
| 5,833,733 | 11/1998 | Walsh et al. | 710/101 |
| 5,841,631 | 11/1998 | Shin et al. | 361/684 |
| 5,941,976 | 8/1999 | Gulick | 710/260 |

OTHER PUBLICATIONS

Intel, "82371FB (PIIX) and 82371SB (PIIX3) PCI ISA IDE Xcelerator", May 1996, pp. 1–118.

Common Architecture, "Desktop PC/AT systems", Mar. 21, 1996, Version .93 Preliminary, pp. 1–26.

Advanced Micro Devices, "AM7968/Am7969 TAXIchip™ Article Reprints", Jan. 22, 1987, pp. 1–77, particularly pp. 67–72.

National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface", Preliminary–Nov. 1995, pp. 1–110.

Primary Examiner—Xuan M. Thai
Attorney, Agent, or Firm—Zagorin, O'Brien & Graham, LLP

[57] ABSTRACT

A computer system includes first and second integrated circuits. The first integrated circuit provides a first input/output bus operating in accordance with a first protocol, such as ISA. The first input/output bus includes a plurality of address and data lines respectively providing address and data information. The second integrated circuit includes a plurality of second functional blocks at least some of which interface to legacy devices. The first integrated circuit includes a host controller circuit, coupled to the first input/output bus and for coupling to a register access bus which includes a register data out and a register data in signal line. The register access bus connects the first and second integrated circuits. The host controller circuit receives address and data information from the input/output bus and serially provides the address and data information to the data out line. A target controller circuit on the second integrated circuit is coupled to the register access bus. The target controller circuit receives the serially provided address and data information and provides the address and data information, over a second representation of the input/output bus, the second representation being at least a subset of the first protocol and including a plurality of internal address lines and a plurality of internal data lines coupled to the second functional blocks. Write operations take place to memory locations in the second integrated circuit from a write operation begun on the first integrated circuit and read operations take place from memory locations in the second integrated circuit for read operations begun on the first integrated circuit.

36 Claims, 12 Drawing Sheets

PC CORE LOGIC CHIPSET COMPRISING A SERIAL REGISTER ACCESS BUS

CROSS REFERENCE TO RELATED APPLICATIONS

This application relates to the following applications: Ser. No. 08/802,321, filed Feb. 18, 1997, entitled "SYSTEM FOR PARTITIONING PC CHIPSET FUNCTIONS INTO LOGIC AND PORT INTEGRATED CIRCUITS", by Dale E. Gulick; Ser. No. 08/802,323, now U.S. Pat. No. 5,926,629, filed Feb. 18, 1997, entitled "CONTINUOUSLY OPERATING INTERCONNECTION BUS", by Dale E. Gulick; Ser. No. 08/928,034, filed the same day as the present application, entitled "PC CHIPSET WITH USER CONFIGURABLE PROGRAMMABLE LOGIC STRUCTURE", by Dale E. Gulick; and Ser. No. 08/929,153, filed the same day as the present application, entitled "SYSTEM POWER MANAGEMENT PARTITIONED ACROSS A SERIAL BUS", by Dale E. Gulick; all of which applications are incorporated herein by reference.

BACKGROUND OF THE INVENTION

1. Field of the Invention

The present invention relates to computer systems, and, more particularly, to the partitioning of input/output functions among integrated circuits.

2. Description of the Related Art

A typical personal computer (PC) system includes a microprocessor, associated memory and control logic and a number of peripheral devices that provide input and output for the system. Such peripheral devices typically include a display monitor, a keyboard and mouse, a floppy disk drive, a hard disk drive and a printer. The number of devices being added to personal computer systems continues to grow. For example, many computer systems also include modems, sound devices, and CD-ROM drives.

PC systems use one of several expansion bus architectures to facilitate communication between various components of the system and to provide the versatility needed to add additional components to the system. For example, the Industry Standard Architecture (ISA) provides an expansion bus for the 16-bit IBM AT personal computer. The Enhanced ISA (EISA) provide for systems utilizing 32-bit microprocessors such as the Intel 80386 and 80486 microprocessors. The Peripheral Component Interconnect (PCI) bus provides a bus architecture for 32-bit or 64-bit interconnection systems independent of processor generation or family.

The ISA bus, originally called the Advanced Technology (AT) bus, added the functionality needed for full 16-bit technology, but maintained compatibility with an older 8-bit PC bus. Because of its initial speed and data-path match with the 80286 microprocessor, the original ISA bus substantially out-performed the PC bus. The ISA bus has resisted replacement by newer bus architectures such as EISA and Microchannel, and remains commonplace in personal computer systems in use today. That is true in part because many devices that are designed to interface with the ISA bus are in widespread use today. Such devices are known as legacy devices since their design is based on older PC technology. Examples of such slower legacy devices include keyboards, and mouse(s), game ports, floppy drives, modems and printers connected respectively to serial and parallel communication ports, direct memory access (DMA) controllers, interrupt controllers and timers. Those legacy devices do not need the high speed throughput of the newer generation of buses such as EISA, Microchannel Architecture (MCA) and the Peripheral Component Interface (PCI) bus.

Although personal computer system speeds, and particularly microprocessor speeds, have increased dramatically, e.g. to 300 MHz and beyond, the speed of the ISA bus is limited to approximately 8 MHz. As higher speed processors were utilized, dedicated memory buses were added to personal computer systems because the ISA bus was too slow for the required high speed memory accesses. Video applications also became limited by the bandwidth of the ISA, so systems began to use a "local bus" for video applications. Although initially targeted at advanced video systems, new local bus specifications were made broad enough for handling other peripherals requiring high-bandwidth transfers such as mass storage devices and network interfaces.

The Peripheral Component Interconnect (PCI) bus is one example of a local bus specification. The VL bus is another local bus specification that has been less widely adopted. The PCI bus provides a high-speed interconnection system which runs more closely to microprocessor speeds than does a traditional expansion bus. And, although initially designed for 32-bit microprocessors, the PCI specification is broad enough to include the 64 bit data paths of the advanced processors. Legacy devices compatible with older bus architectures such as ISA connect to the PCI bus via a bus bridge circuit which provides for a translation between the protocols of the ISA and PCI buses.

Many present day personal computer systems contain both a PCI bus and an ISA bus. The PCI bus is used to connect to newer peripherals and/or those peripherals requiring a higher speed interface. The ISA bus is typically connected to legacy devices. Historically, interfaces to peripherals utilized a large number of discrete components. However, increased levels of integration has resulted in the logic necessary for interfacing to peripheral devices being combined into a relatively few integrated circuits (ICs), which are sold as chip sets for the PC, such as such as Intel's 430 VX chip set. The integrated circuits include a plurality of terminals, pins, or leads, connecting the integrated circuit to the printed circuit board (PCB) to which the integrated circuit is mounted. The PCB functions as a system board. The terminals communicate input/output (I/O) signals between one integrated circuit and other integrated circuits or I/O devices coupled to the system board. These system boards often receive expansion boards to increase the capabilities of the computer system and to connect to peripheral devices, e.g., through the ISA bus.

Referring, to FIG. 1, an exemplary prior art computer system 100 is shown conforming to the above architectural approach of including both a PCI bus and an ISA bus. Computer system 100 includes processor 110 which is coupled to secondary cache 115 and memory 140. Bridge 120 provides an interface between the processor/memory system 105 and PCI bus 125. Bridge 120 provides a communication link between PCI devices 150, 160 and 165 and the processor/memory system 105. Although the PCI bus was originally intended for graphics, high speed graphics requirements have resulted in another specialized graphics bus called the Advanced Graphics Port Bus which can be utilized in place of the PCI bus for graphics applications. The PCI devices may be integrated circuits on the system board of computer system 100, expansion components connected to PCI bus 125 via expansion slots, or some combination thereof. A second bridge 130, provides a bus interface between PCI bus 125 and ISA expansion bus 135. In order to communicate with legacy devices which are designed to interface to the ISA bus, one approach, has been to provide super I/O chip 170 which provides the logic and pins to interface to legacy devices.

Super I/O chip 170 provides I/O terminals and control logic for commonly used legacy peripheral devices such as keyboards, IDE drive, IEEE parallel port, serial communication ports. One example of such an I/O chip is the National Semiconductor PC87306 SuperI/O™ chip. Thus, legacy devices can be included in the system by utilizing the bridge 130, the ISA bus, and super I/O chip 170. In order to integrate functional logic into as few parts as possible it would be desirable it integrate a bridge function with a legacy I/O chip. However, that can require a larger number of input/output pins than can be economically accommodated on a single chip.

SUMMARY OF THE INVENTION

It has been discovered to provide a processor system which accounts for the problem of high integration resulting in overly high pin counts by providing two integrated circuits coupled by a serial bus. In accordance with one embodiment of the invention a computer system includes first and second integrated circuits. The first integrated circuit includes a first input/output bus operating in accordance with a first protocol, such as ISA. The first input/output bus includes a plurality of address and data lines respectively providing address and data information. The second integrated circuit includes a plurality of functional blocks at least some of which interface to legacy devices. The first integrated circuit includes a plurality of additional functional blocks which interface to the first input/output bus. The first integrated circuit includes a host controller circuit, coupled to the first input/output bus and for coupling to a register access bus which includes a register data out and a register data in signal line. The register access bus connects the first and second integrated circuits. The host controller circuit receives address and data information from the first input/output bus and serially provides the address and data information to the data out line. A target controller circuit on the second integrated circuit is coupled to the register access bus. The target controller circuit receives the serially provided address and data information and provides the address and data information over another representation of the first input/output bus, which includes a plurality of internal address lines and a plurality of internal data lines coupled to the second functional blocks. The address information identifies an address location within one of the functional blocks in the second integrated circuit.

In accordance with another embodiment of the invention, a method of operating a register transfer bus which couples a first and second integrated circuit is provided. The register transfer bus includes a register data in line and a register data out line. The method includes receiving a request in a host controller circuit in the first integrated circuit. The host controller circuit interfaces to the register transfer bus. The request is for a register access operation, the register access operation is either a read or a write operation to an addressable location in the second integrated circuit. The request is provided to the host controller circuit according to a protocol of a first expansion bus in the first integrated circuit, and includes providing address, data and read/write information according to the protocol. The first integrated circuit serially transmits a write address, the data and the read/write information to the second integrated circuit over said register data out line for a register write operation. The second integrated circuit provides the received address and data information according to at least a subset of the protocol to functional blocks in the second integrated circuit, to thereby provide the addressable location identified by the address information within one of said functional blocks, with the data information.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

DESCRIPTION OF THE PREFERRED EMBODIMENT(S)

Figure 1:
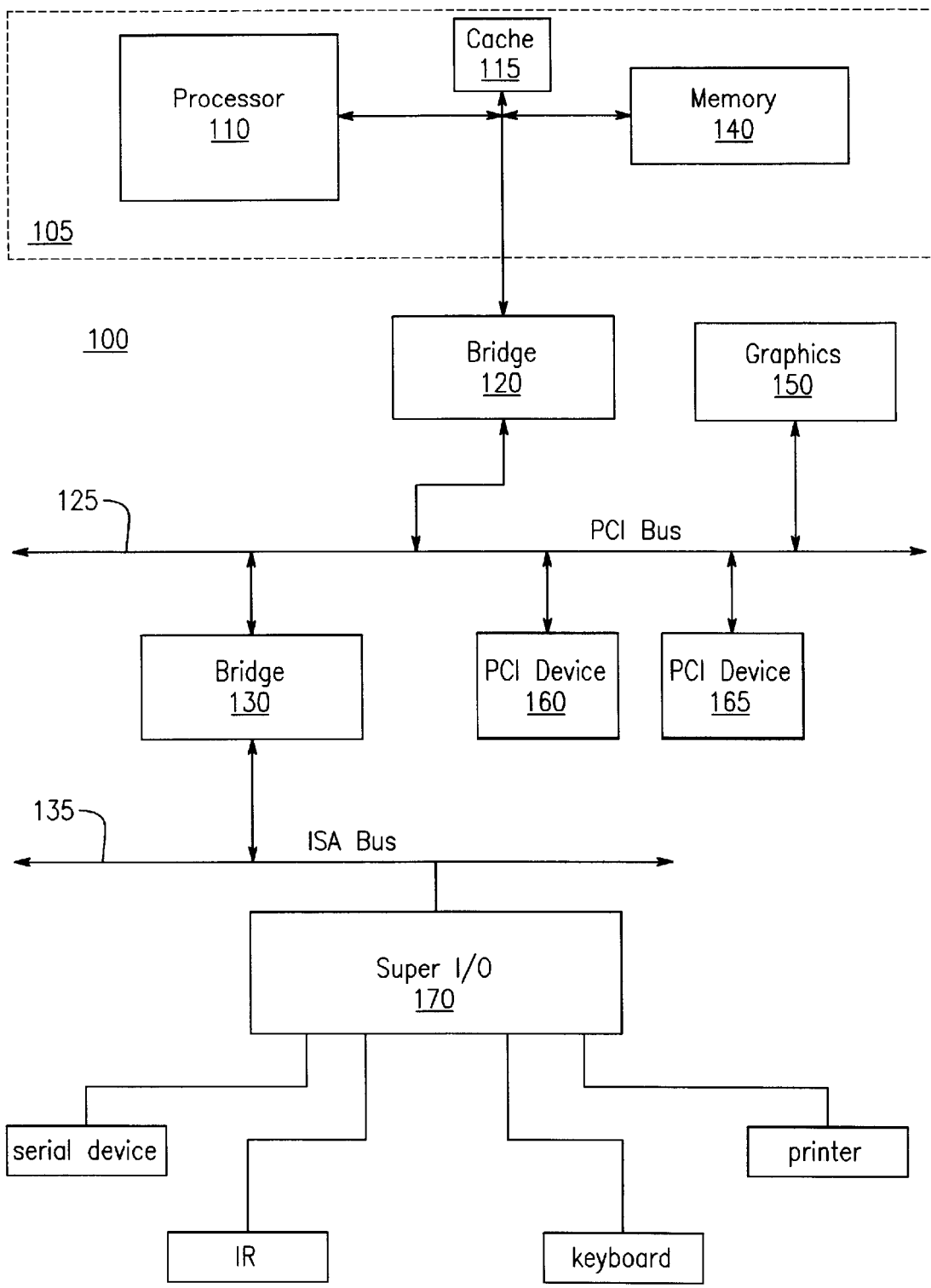
FIG. 1 shows a schematic block diagram of a prior art personal computer system.
Figure 2:
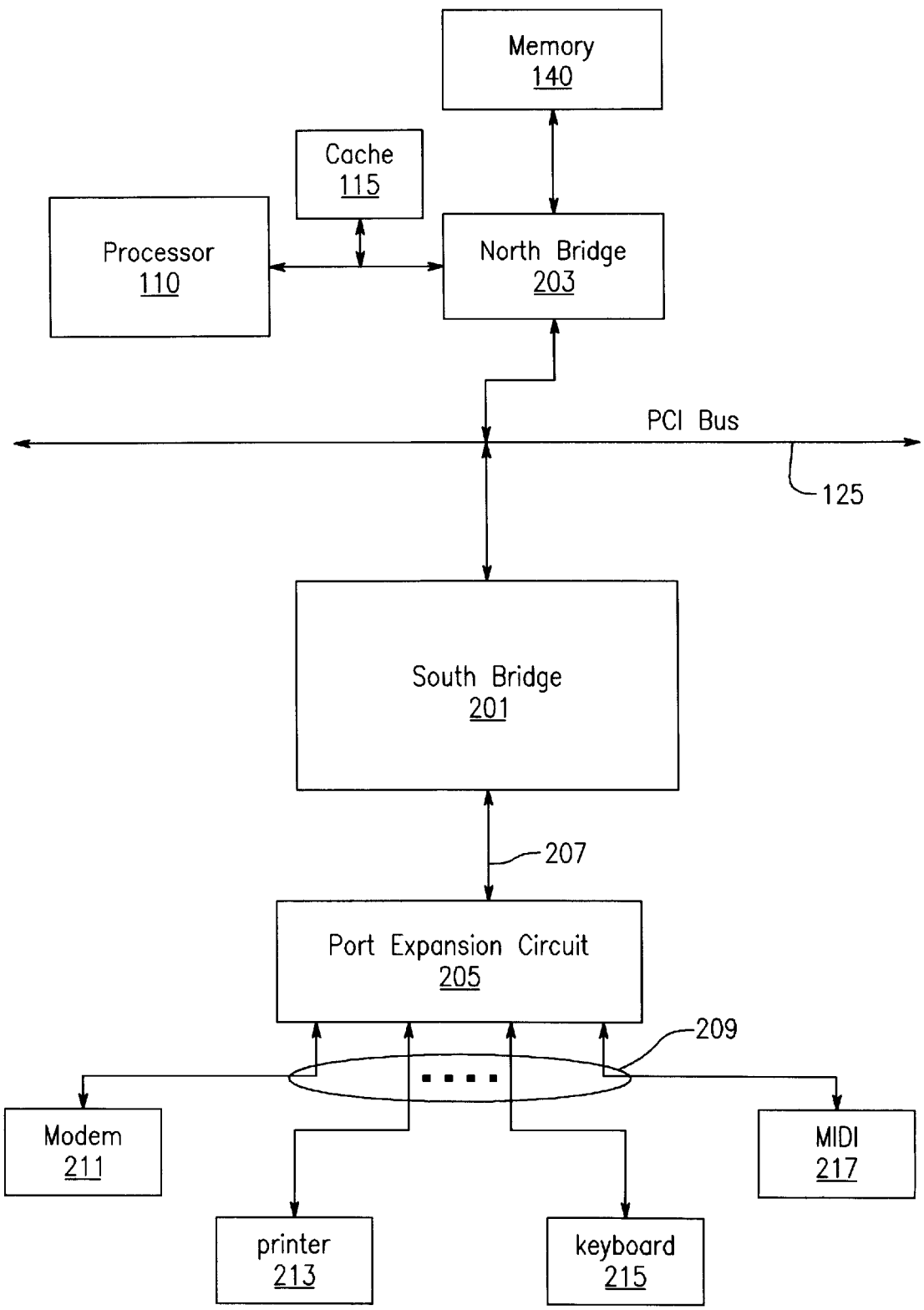
FIG. 2 shows a block diagram of a computer system which includes a South Bridge circuit and port expansion circuit in accordance with the present invention.

FIG. 2 shows one embodiment of a personal computer system according to the present invention. The personal computer system comprises processor 110 which is coupled to cache memory 115 and memory 140. Bridge circuit 203 (North Bridge), provides an interface between the processor 110 and PCI bus 125. North Bridge 203 also provides an interface between the PCI bus 125 and memory 140. Bridge circuit 201 (South Bridge) provides an interface between PCI bus 125 and a plurality of devices and/or interfaces. A separate integrated circuit 205, connects to the South Bridge 201 via port expansion bus 207. The separate circuit 205 will be referred to herein as the port expansion circuit (PEC). The port expansion bus (PEB) is a seven pin serial bus.

Figure 3:
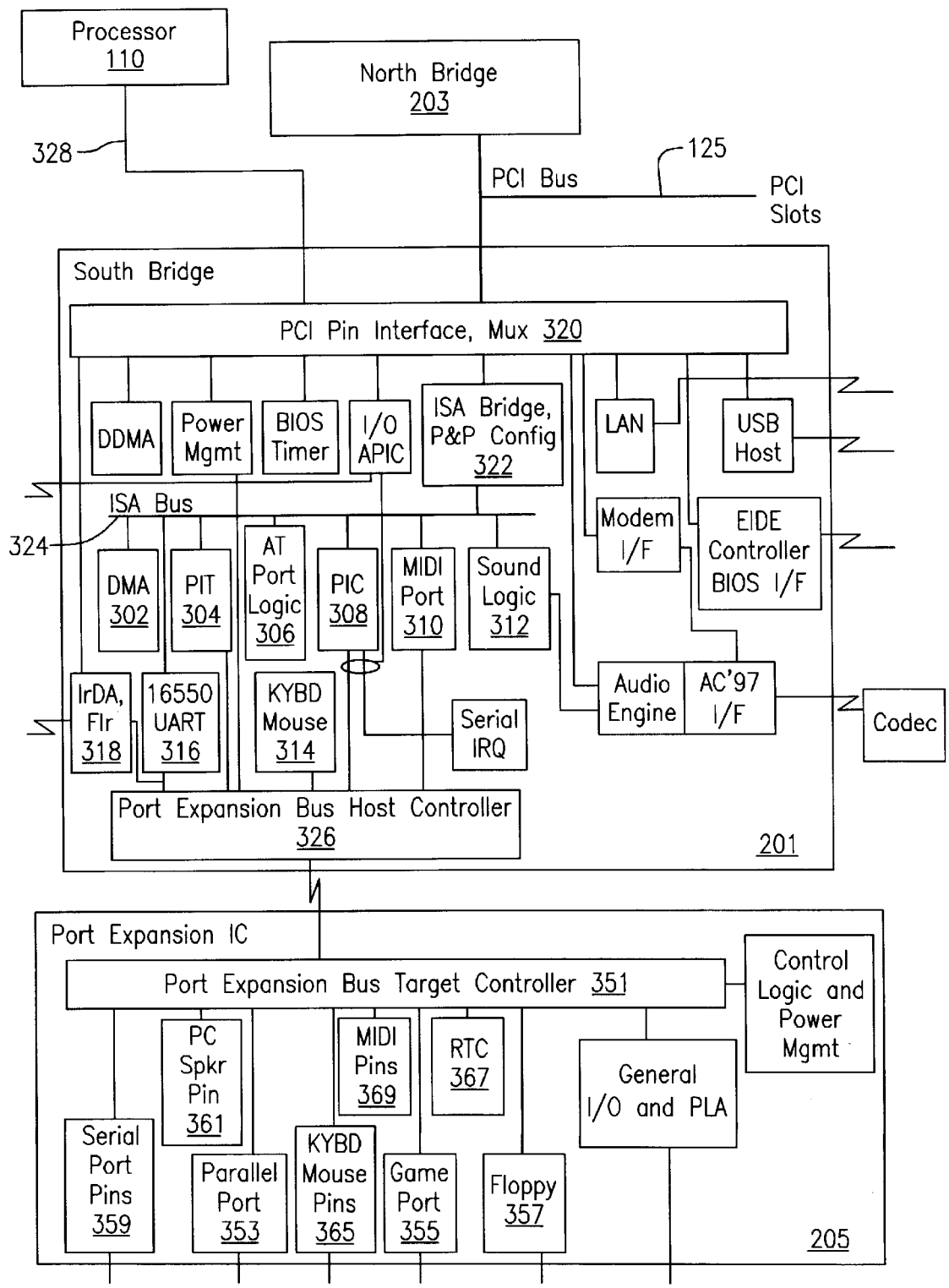
FIG. 3 shows a block diagram of the South Bridge integrated circuit and the Port Expansion integrated circuit of the personal computer architecture of FIG. 2.

Referring to FIG. 3, the South Bridge 201 and the port expansion circuit 205 are shown in greater detail. The South Bridge provides an interface 320 with the PCI bus. Interface 320 in one embodiment of the invention is a multiplexer structure providing a way to interface various blocks on the South Bridge with PCI bus 125. One such block is the ISA bridge 322. The bridge 322 creates an internal ISA bus 324 on the South Bridge. Full ISA compliance is not a requirement to interface to the various ISA resident blocks, but providing full ISA capability, including bus mastering capability may provide greater flexibility. The various ISA resident blocks on the internal ISA bus 324 in the South Bridge circuit include direct memory access (DMA) block 302 (e.g., dual 8237A compatible controllers), Programmable Interval Timer (PIT) 304 (e.g., an 8254 compatible counter/timer unit), AT port logic 306, programmable interrupt controller 308 (e.g., 8259A compatible), musical instrument digital interface (MIDI) 310, sound logic, (e.g., SOUND BLASTER) block 312, one or more universal asynchronous receiver transmitter(s) (UART) block 316, which for the embodiment shown is a 16550 UART, and keyboard/mouse logic 314. These blocks are representative, in that additional or fewer ISA resident functional blocks may actually be provided in any particular South Bridge embodiment.

The South Bridge also includes sideband signals 328 which are coupled to processor 110. Such sideband signals provide for legacy signals such as interrupts which can not be handled over the PCI bus.

In addition to the South Bridge having ISA resident blocks, PEC 205 also includes ISA resident blocks. For example, PEC 205 includes parallel port 353, game port 355, real time clock (RTC) 367, floppy disk drive controller 357. Such logic is well known in the personal computer industry and is not described further herein except where necessary for a better understanding of the claimed invention. The PEC also provides all of these ISA resident blocks with the necessary I/O terminals to connect to the legacy devices. Thus, for instance, the floppy control block 357 can be coupled to a floppy drive (not shown) and game port 355 can be coupled to a joystick (not shown) and parallel port 353 can be coupled to a printer (not shown) on the parallel port.

The PEC also provides a pin reflection function for the South Bridge. That means that the states of relatively slowly changing signals are transmitted over a time-division serial bus and recreated on the other side. That is, the PEC provides I/O terminals for some of the ISA resident blocks in the South Bridge such as UART 316, PIT 304, keyboard/mouse logic 314 and MIDI port 310. Output signals that would ordinarily be output by I/O terminals on the South Bridge to a legacy device, are instead transmitted to the PEC, and then output to the legacy device from I/O terminals on the PEC. Thus, serial port pins 359 provide the input/output pins for UART 316. Similarly, output pin 361 provides PIT 304 a connection to the PC Speaker. Keyboard/mouse pins 365 which connect respectively to a keyboard and mouse provide I/O pins for keyboard/mouse logic 314 in South Bridge 201. Finally, in the embodiment shown, MIDI pins 369 provide a connection to a musical instrument for MIDI port 310.

In order for the Port Expansion Circuit 205 to provide I/O function for the South Bridge integrated circuit, the output signals have to be sampled in the South Bridge and provided to the output pins of the port expansion circuit at a rate faster than the output signals change. Additionally, the input signals on the input pins of the port expansion circuit have to be sampled and provided to the interface logic blocks in the South Bridge integrated circuit at a rate faster than the input signals change.

Thus, the PEC is seen to provide several functions. One function is to provide I/O terminals for pin reflection. Another function is to provide both the functional logic and the I/O terminals for ISA resident logic blocks. Accordingly, to accommodate ISA resident functional logic blocks, the port expansion bus target controller block 351 recreates an internal ISA-like parallel bus in the port expansion circuit 205 which is described in greater detail in FIG. 14 and related discussion. The recreated parallel bus couples to ISA resident blocks in the port expansion circuit, such as parallel port 353, game port 355 and floppy control logic 357.

Serial bus 207, which couples the South Bridge integrated circuit 201 to the port expansion integrated circuit 205, provides both the pin reflection function by transferring the state of input/output signals across the bus and also provides for register access operations to ISA addressable registers in the PEC. The serial bus 207 also provides for additional functions which are described further herein.

Figure 4:
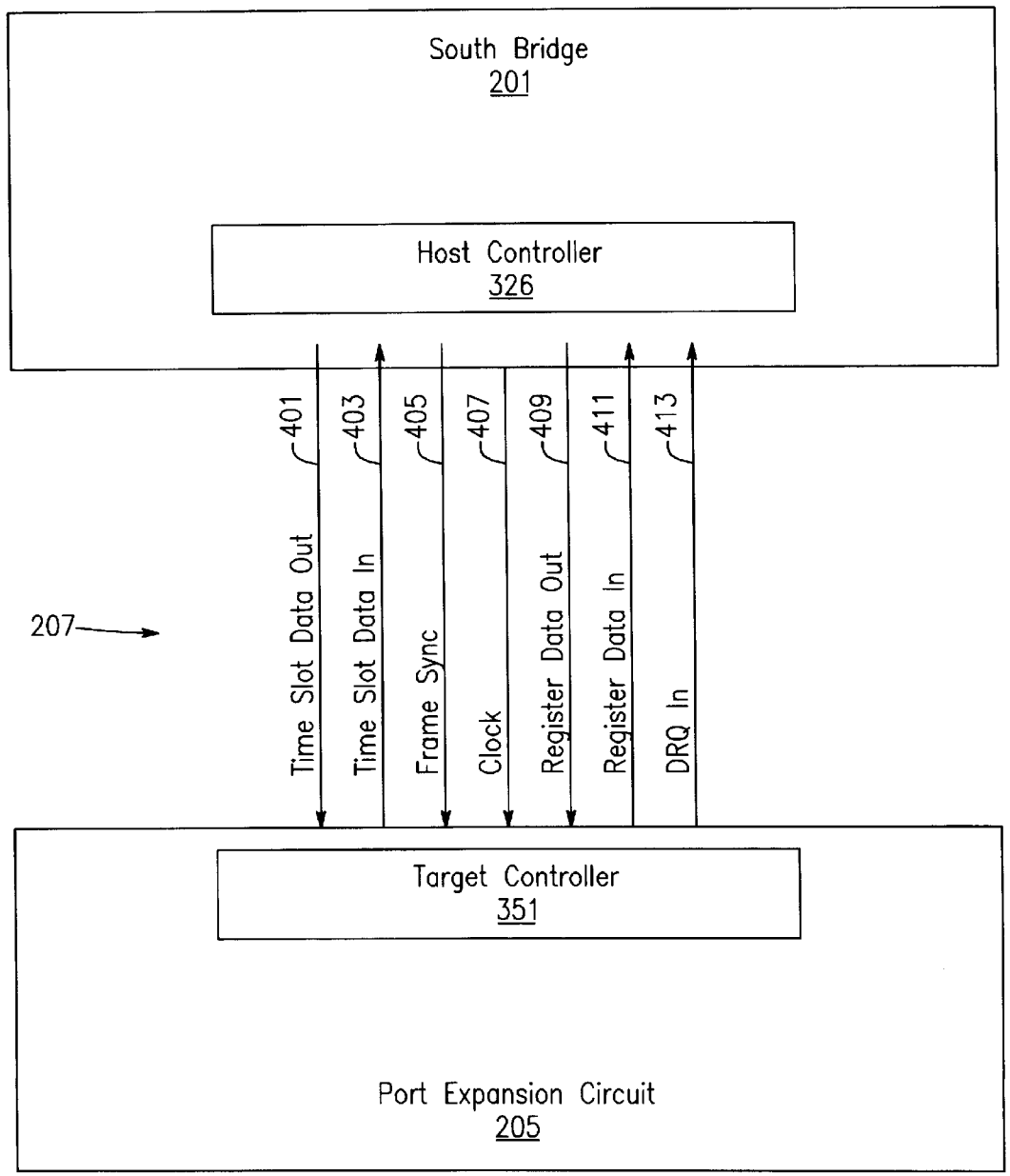
FIG. 4 shows a seven line embodiment of the port expansion bus (PEB) connecting the South Bridge and the port expansion circuit of the computer system of FIG. 2 including a time slot portion and a register transfer portion.

Referring to FIG. 4, the port expansion bus provides a time slot bus for "pin reflection." The time slot bus transfers frames of relatively slowly changing data between the South Bridge 201 and the port expansion circuit 205. In one embodiment each frame has 32 data bits. The time slot bus includes time slot data out signal line 401, time slot data in signal line 403, frame sync 405 and clock 407. The time slot bus transfers relatively slow signals on time slot data out signal line 401 from South Bridge 201 to be output by port expansion circuit 205. The signals are time multiplexed and are provided to the appropriate output pin and thus the output device according to the time slot on the bus. The time slot bus also operates to transfer signals that are received from relatively slow legacy devices such as a modem coupled to serial port pins 359, from the port expansion circuit to the South Bridge on time slot data in signal line 403.

Figure 5A:
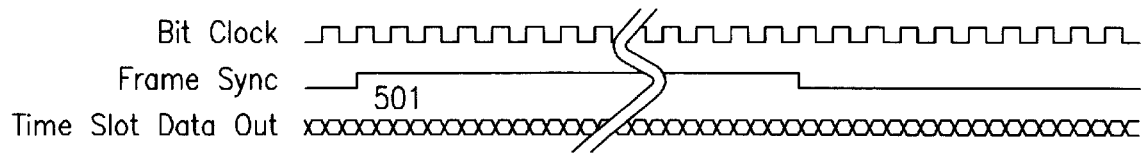
FIG. 5a is a timing diagram showing a frame sync signal for the time slot portion of the port expansion bus (PEB).
Figure 5B:
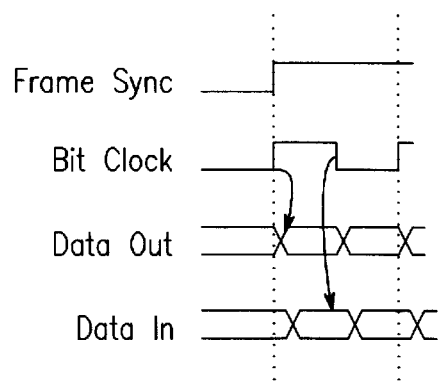
FIG. 5b is a timing diagram showing the relation between the frame sync signal, the bit clock, Data In and Data Out on the port expansion bus.

Referring to FIG 5a, the beginning of each frame for the time slot bus is determined by assertion of the frame sync signal at 501 which is synchronous with the bit clock. The frame sync signal is preferably a 50% duty cycle signal and is output from the South Bridge. The frame sync frequency (2.0625 Mhz), in the embodiment shown, is 1/16 that of the bit clock which is a 33 Mhz 50% duty cycle clock (same frequency as the PCI clock). Frames are synchronized to the rising edge of the frame sync signal. Data on the time slot bus is synchronized with frame sync with time slot 0 on the bus corresponding to the rising edge of frame sync. As shown in FIG. 5b, a data bit is provided on both the rising and falling edge of the clock. Thus, data on signal lines 401 and 403 is transmitted on both the rising and falling edges of the clock. Accordingly, a 32 bit frame requires 16 bit clock periods. The data provided by the PEC on the rising edge of the bit clock is latched on the falling edge of the bit clock in the South Bridge as shown in FIG. 5b. In the embodiment shown, bit clock 407 is output from the South Bridge integrated circuit.

The clock, frame sync, time slot data in and data out signals are held high when the bus is deactivated. Note that other frame lengths, clock frequencies and duty cycles are of course possible.

An exemplary frame sent to and from PEC 205 is shown in Table 1. The bits transmitted to the PEC include bits 0–3 which are signals to be provided to the serial port pins on the PEC. Bits 0 and 1 are pin reflection signals including transmit data (TD) for serial ports 1 and 2, request to send (RTS/) and data terminal ready (DTR/) for port 0. The data transmit data bits for serial port 0 and 1 are repeated for bits 6 and 7. Port 1 RTS/ and DTR/ bits are provided in bits 8 and 9. MIDI data is provided on bits 12 and 26. Keyboard and mouse data is provided on bits 27 and 28. A mouse clock out bit is provided on bit 30 and a PC speaker on bit 31. The detailed operation the various ports and interfaces with respect to these control and data bits is well known in the art. The bus speed of the time slot bus should be sufficient to ensure that the various devices receive necessary data and control signals in a timely manner, i.e., the pin reflection function keeps up with the rate of change of the various interfaces.

TABLE 1

| Bit # | Transmit to PEC | Receive from PEC |
|---|---|---|
| 0 | Serial port 0 TD | Serial port 0 RD |
| 1 | Serial port 1 TD | Serial port 1 RD |
| 2 | Serial port 0 RTS/ | Serial port 0 CTS/ |
| 3 | Serial port 0 DTR/ | Serial port 0 DSR/ |
| 4 | Reserved | Serial port 0 DCD/ |
| 5 | Reserved | Serial port 0 RD |
| 6 | Serial port 0 TD | Serial port 1 RD |
| 7 | Serial port 1 TD | Serial port 0 RI |
| 8 | Serial port 1 RTS/ | Serial port 1 CTS/ |
| 9 | Serial port 1 DTR/ | Serial port 1 DSR/ |
| 10 | Reserved | Serial port 1 DCD/ |
| 11 | reserved | Serial port 1 RI |
| 12 | MIDI Tx Data | MIDI Rx Data |
| 13 | Reserved | Wake-up A |
| 14 | Reserved | Wake-up B |
| 15 | Reserved | Wake-up C |
| 16 | Serial port 0 TD | Serial port 0 RD |
| 17 | Serial port 1 TD | Serial port 1 RD |
| 18 | Reserved | Power button |
| 19 | Reserved | Sleep button |
| 20 | Reserved | Reserved |
| 21 | Reserved | Reserved |
| 22 | Reserved | Wake-up D |
| 23 | Reserved | Wake-up E |
| 24 | Serial port 0 TD | Serial port 0 RD |
| 25 | Serial port 1 TD | Serial port 1 RD |
| 26 | MIDI Tx Data | MIDI Rx Data |
| 27 | Keyboard Data Out | Keyboard Data In |
| 28 | Mouse Data Out | Mouse Data In |
| 29 | Keyboard Clock Out | Wake-up F |
| 30 | Mouse Clock Out | Wake-up G |
| 31 | PC Speaker | Wake-up H |

Table 1 also shows the bits received from the PEC. Bits 0–11, 16 and 17, 24 and 25 relate to the serial port. Included in the signals received are receive data (RD), clear to send (CTS), data set read (DSR/), data carrier detect (DCD), and ring indicator (RI). The receive frame also includes MIDI receive data (bits 12 and 26) and several bits associated with power control features including wake-up bits 13–15, 22–23, and 29–21 and power and sleep buttons 18 and 19. The wake-up bits and power and sleep buttons relate to power management functions. For example, if the system is in a sleep state, the wakeup buttons can indicate which event caused the wakeup to occur. In addition, the receive frame includes data from the keyboard and mouse (bits 27 and 28, respectively).

Thus, every frame includes the data and control bits shown in Table 1. All bits in Table 1 are numbered with respect to the leading edge of frame sync. The time slot bus is "protocol free", in that there is little overhead associated with transferring data. The bus simply continuously transfers frames between the port expansion circuit and the South Bridge. In the embodiment shown, the frames are contiguous in that there is no time between each frame, i.e., the start of bit 0 is one half clock period from the start of bit 31. However, other embodiments may provide some time period between frames so long as the time slot bus stays substantially continuously running to satisfy the speed requirements of the pin reflection approach described herein. Note that the I/O pin values are transferred every frame whether they change or not. Also note that transmit and receive data bits may be transmitted more than one time per frame. That further reduces latency for pin reflection purposes. At a data bit rate of 66 Mhz, the MIDI port in the South Bridge can transmit and receive data via the I/O pins on the PEC at an a rate of 4.125 Mhz (twice per frame). Note that the time slot bus does not operate while the port expansion circuit and South Bridge are in a power down mode to reduce power consumption.

Figure 6:
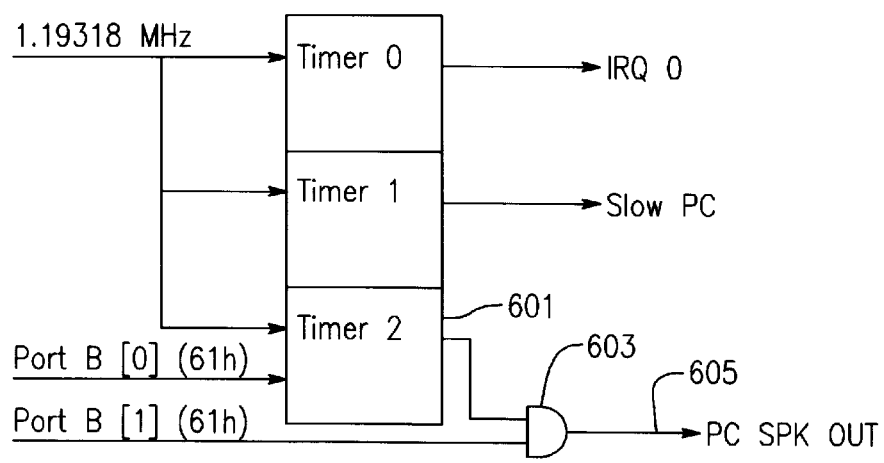
FIG. 6 shows external gating of the PC speaker out signal.

An exemplary pin reflection function according to the invention is described as follows. The PC Speaker is connected to the counter-timer block 304 in the South Bridge and the frequency of the speaker is determined by the frequency of the digital signal output by the counter timer block 304 which is, e.g., an 8253 or 8254-2 equivalent timer/counter. Referring to FIG. 6, the PC speaker out signal 605 is gated external to PIT 601 by I/O port B (61h) bit (1) at gate 603. The PC speaker timer (timer 2) is enabled by I/O port B bit(0)(61h). At approximately the start of bit time 31 of each frame, the state of the counter timer's PC Speaker output is sampled in the South Bridge. Note that the state of the output of the counter timer may be sampled earlier than bit time 31. Bit position 31 in the frame is updated with the latest sampled value and transmitted to the port expansion circuit. At the port expansion circuit end, the state of the PC Speaker pin is latched during bit time 31. The PC Speaker pin on the port expansion circuit always reflects the latched value. Thus, the PC Speaker pin always reflects the state of the counter timer output, with a delay (and jitter) of up to approximately 485 nanoseconds assuming a data rate of 66 MHz and a 32 bit frame.

Various functions within a personnel computer system can utilize pin reflection as provided by the four pin time slot bus described herein. Such functions include the PC speaker, MIDI port, keyboard and mouse and serial ports.

Referring back to FIG. 4, the port expansion bus also provides a register transfer function, that is, the capability to read and write registers in ISA resident logic located in the PEC. In order to provide that register transfer function, the port expansion bus 207 includes a register transfer bus portion that includes register data out signal line 409 from the SB to the PEC and register data in signal line 411 from the PEC to the SB.

Figure 7:
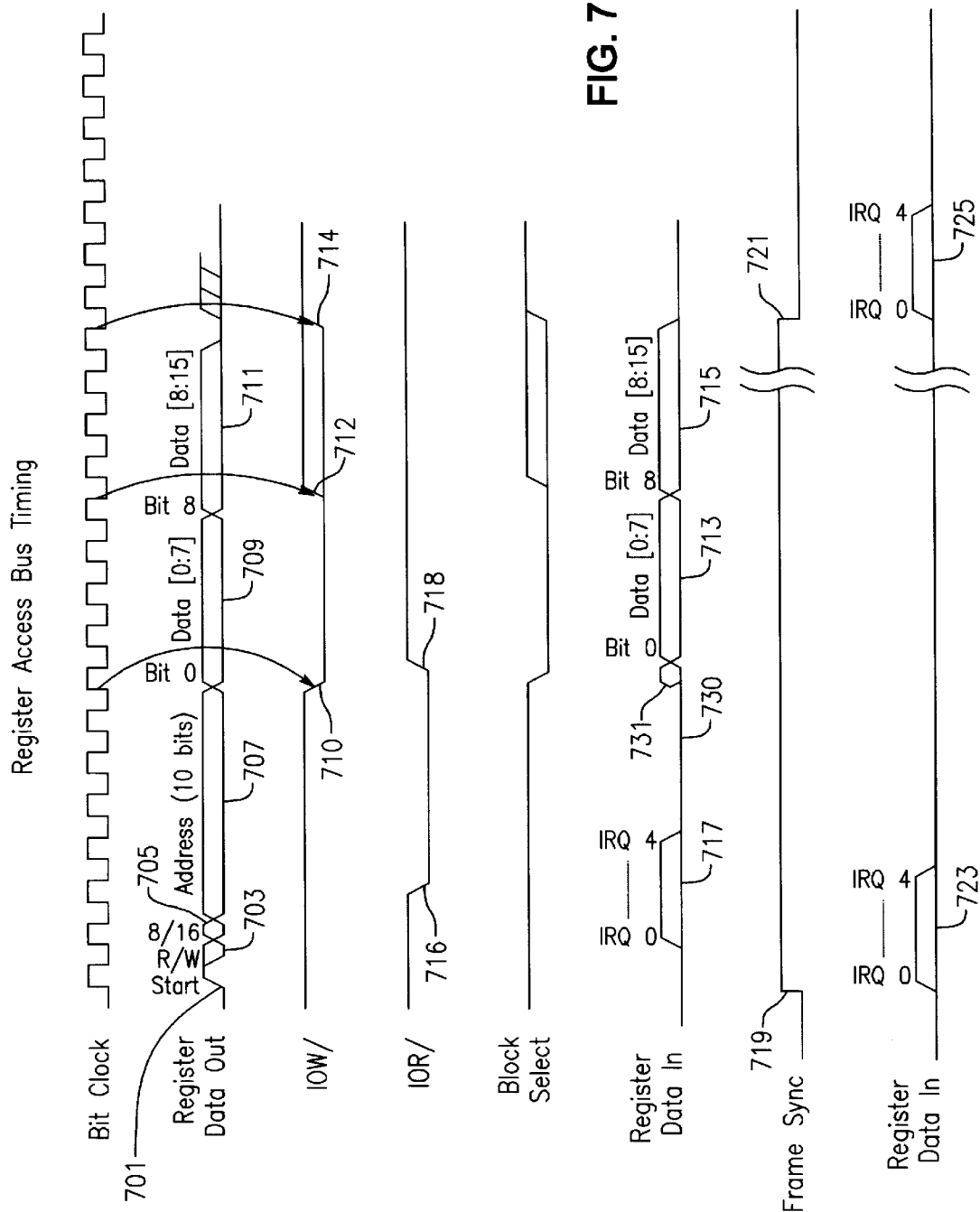
FIG. 7 shows a timing diagram for the register transfer bus portion of the port expansion bus.

The register data out line 409 is output from the SB. As with the time slot bus, data is transmitted synchronous to both edges of clock 407. However, register reads and writes on the register transfer bus are asynchronous to the frame sync signal. Instead, a start bit is used. Referring to FIG. 7, the communication protocol for the register access bus is shown. Start bit 701 initiates a transfer sequence and in the embodiment shown, is always initiated from the SB. Following start bit 701, read/write bit 703 indicates the direction of transfer (write=1, read=0). The next bit 705, indicates the size of the read or write operation, (1=16 bits, 0=8 bits). A 10 bit address field 707 identifies the particular register in the PEC that is to be read or written. For a write operation, eight bit data 709, or sixteen bit data, 709 combined with data 711, are provided after the address field 707.

In order to account for possible delay in obtaining read data from e.g., the parallel port, a ready bit 731 alerts the South Bridge that read data is ready. In addition, one clock cycle may be provided between the address bits and the data bits during a read cycle at 730, to provide time for the PEC to decode the address and provide the contents of the selected register to the register transfer bus. The use of the ready bit 731 may make the one clock cycle 730 unnecessary. The ready bit is not necessary if all read data can be guaranteed to be ready. The delay caused by the lack of a ready bit during the read operation can be utilized in the South Bridge to control a CHRDY signal on the ISA bus which can stall the processor when data is not yet ready from e.g., the parallel port. Once the read operation is completed, the register data out pin is held low for at least one bit time (in this embodiment half a clock cycle) between transfers so that a new start bit can be recognized. In the exemplary embodiment, the register data out pin is held high when the bus is deactivated and low when active and idle.

In addition to providing read data, the register data in signal line provides, interrupt request (IRQ) information synchronized to the frame sync signal, whenever register reads are not taking place. That is, when the bus is idle or when register writes are taking place, the register data in line which is used only during reads, is available to send IRQ data. In the described embodiment, IRQ data is sent four times per frame sychronized to frame sync in a manner similar to the previously described time slot bus. An exemplary IRQ frame is shown in Table 2.

TABLE 2

| Bit # | ASSIGNMENT | Bit # | ASSIGNMENT |
|---|---|---|---|
| 0 | IRQ0 | 16 | IRQ0 |
| 1 | IRQ1 | 17 | IRQ1 |
| 2 | IRQ2 | 18 | IRQ2 |
| 3 | IRQ3 | 19 | IRQ3 |
| 4 | IRQ4 | 20 | IRQ4 |
| 5 | Reserved | 21 | Reserved |
| 6 | Reserved | 22 | Reserved |
| 7 | Reserved | 23 | Reserved |
| 8 | IRQ0 | 24 | IRQ0 |
| 9 | IRQ1 | 25 | IRQ1 |
| 10 | IRQ2 | 26 | IRQ2 |
| 11 | IRQ3 | 27 | IRQ3 |
| 12 | IRQ4 | 28 | IRQ4 |
| 13 | Reserved | 29 | Reserved |
| 14 | Reserved | 30 | Reserved |
| 15 | Reserved | 31 | Reserved |

The interrupt requests, are interrupts requests from such devices as the parallel port, game port, RTC, floppy controller and General I/O.

When register reads are taking place, the IRQ data 717 is provided on Register Data In line during the address window as shown in FIG. 7. That is, when address bits are being received, the data in line is still idle even though it is a read operation. The address window for IRQs can be any predetermined time between start bit 701 and the read data 713. If a register read starts in the middle of the receipt of a frame of IRQ data (which is synchronous to frame sync and not the start bit), the PEC ceases transmission of the frame sync IRQ data and starts the register read cycle including the transmission of a field of IRQ data 717 as shown in FIG. 7.

In addition to providing IRQ requests, DMA requests are also generated in functional logic blocks in the PEC such as the floppy disk controller and the parallel port. In order to accommodate these DMA requests, a separate DMA request signal line 413, DRQ In, is provided as shown in FIG. 4. The DMA request signal line 413 provides frames of DMA requests in a manner similar to the IRQ frame data. The DRQs are sent over the DRQ In line synchronous to the frame sync signal. Table 3 shows and exemplary DRQ frame with bit 0 being synchronous to the rising edge of

TABLE 3

| Bit # | ASSIGNMENT | Bit # | ASSIGNMENT |
|---|---|---|---|
| 0 | Floppy DRQ | 16 | Floppy DRQ |
| 1 | Parallel port DRQ | 17 | Parallel Port DRQ |
| 2 | Reserved | 18 | Reserved |
| 3 | Reserved | 19 | Reserved |
| 4 | Floppy DRQ | 20 | Floppy DRQ |
| 5 | Parallel Port DRQ | 21 | Parallel Port DRQ |
| 6 | Reserved | 22 | Reserved |
| 7 | Reserved | 23 | Reserved |
| 8 | Floppy DRQ | 24 | Floppy DRQ |
| 9 | Parallel Port DRQ | 25 | Parallel Port DRQ |
| 10 | Reserved | 26 | Reserved |
| 11 | Reserved | 27 | Reserved |
| 12 | Floppy DRQ | 28 | Reserved |
| 13 | Parallel Port DRQ | 29 | Reserved |
| 14 | Reserved | 30 | Reserved |
| 15 | Reserved | 31 | Reserved |

Figure 8:
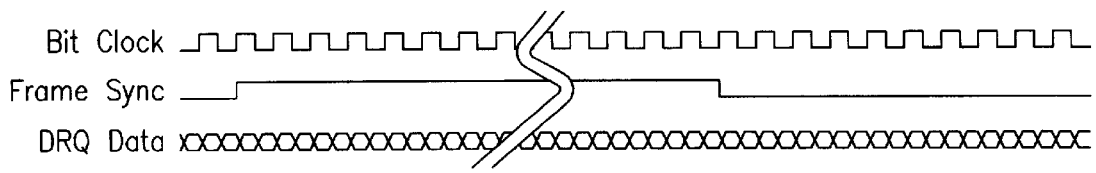
FIG. 8 shows a timing diagram for the DRQs being sent over the DRQ In signal line.

The parallel port and floppy disk controller DRQ fields are provided seven times each 32 bit frame. The number of fields provided in each frame depends upon the latency acceptable for the DRQ which is affected by such factors as the device issuing the DRQ and the speed of the bit clock. For the embodiment described herein a bit slot in the DRQ frame is determined by both the rising and falling edge of the bit clock provided on the clock line 407. In other words, each clock period contains two data bits. DRQ data is sent synchronous to both the rising and falling edges of frame sync as shown in FIG. 8.

The ITQs and DRQs provided by the PEC are routed through a mapping unit to the interrupt controllers and DMA controllers in the SB as described further herein.

Figure 9:
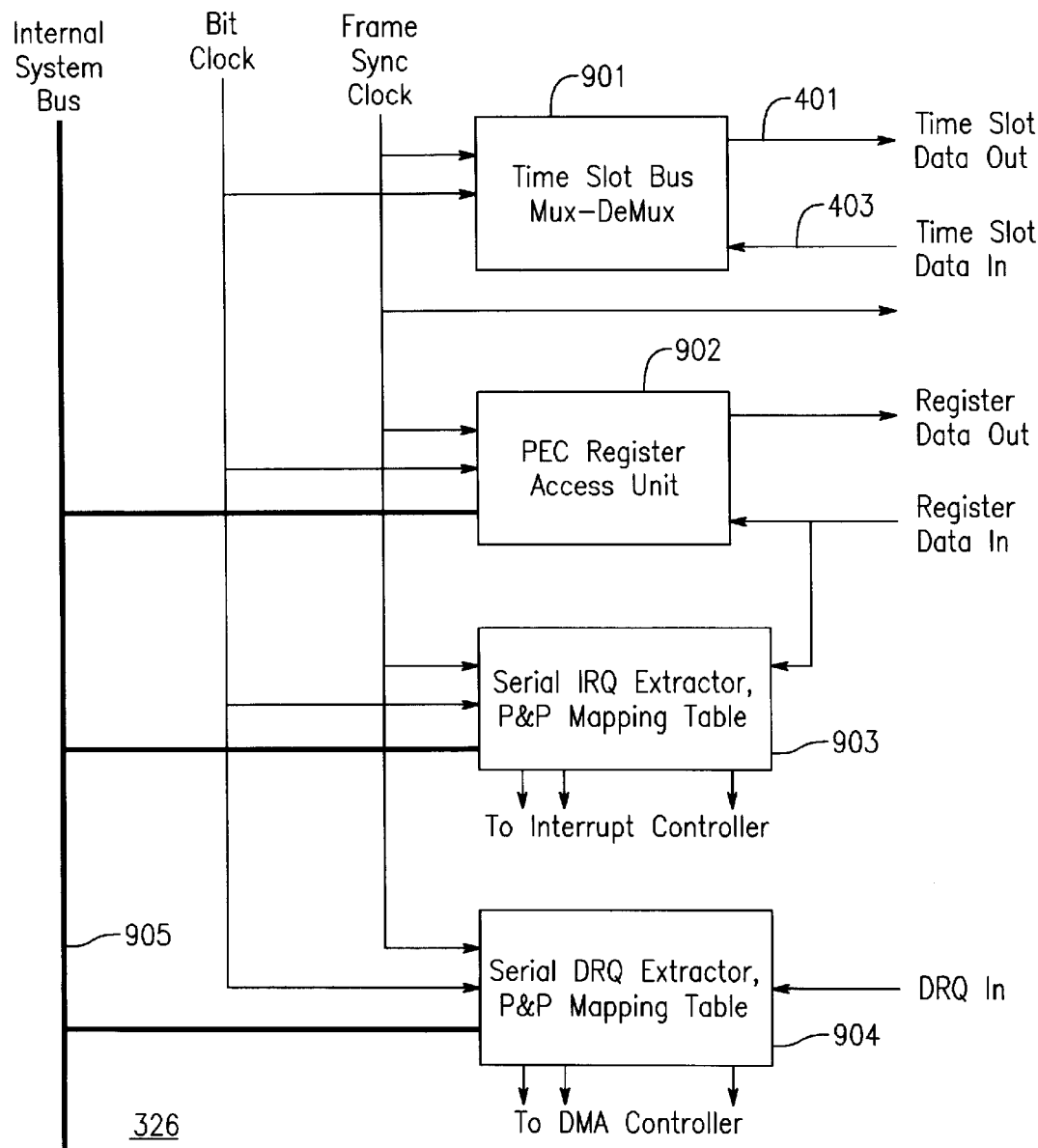
FIG. 9 shows a block diagram of the port expansion bus host controller.

Referring to FIGS. 3 and 4, the port expansion host controller 326 provides the interface between the various signal lines on the port expansion bus and the rest of the South Bridge integrated circuit. Referring to FIG. 9, the host controller 326 is shown in block diagram form. Block 901 receives the time slot data in and provides the time slot data out signal lines. Block 901 also receives the frame sync and the bit clock. Block 901 provides a multiplexing-demultiplexing function to multiplex data bits from the PIT 304, keyboard/mouse controller 314, MIDI controller 310, and the serial port(s) 316 into their appropriate time slot on the time slot bus. Block 901 also receives serial port data, MIDI data, keyboard and mouse data and various power management and general I/O related signals and demultiplexes those signals at their appropriate time slot and provides the signals to the appropriate logic function in the SB.

PEC Register access unit 902 receives the bit clock and frame sync from the SB side and provides the register data out signal and receives the register data in signal from the PEC. In addition, the PEC register access unit 902 is coupled to the internal system bus 905, shown as ISA bus 324 in FIG. 3. Writes to an ISA address space on the PEC will be serialized and provided as described previously. For reads from the PEC registers, the data read is provided to the internal SB ISA bus and across the ISA/PCI bridge to the appropriate destination, e.g., the CPU.

The serial IRQ extractor and Plug and Play (P & P) mapping table 903, extracts the IRQs from the stream of data on the register data in line and maps the IRQs according to a programmable IRQ mapping table.

The serial DRQ extractor and Plug and Play (P & P) mapping table 904, extracts the DRQs from the stream of data on the DRQ data line and maps the DRQs according to a programmable DRQ mapping table.

Figure 10:
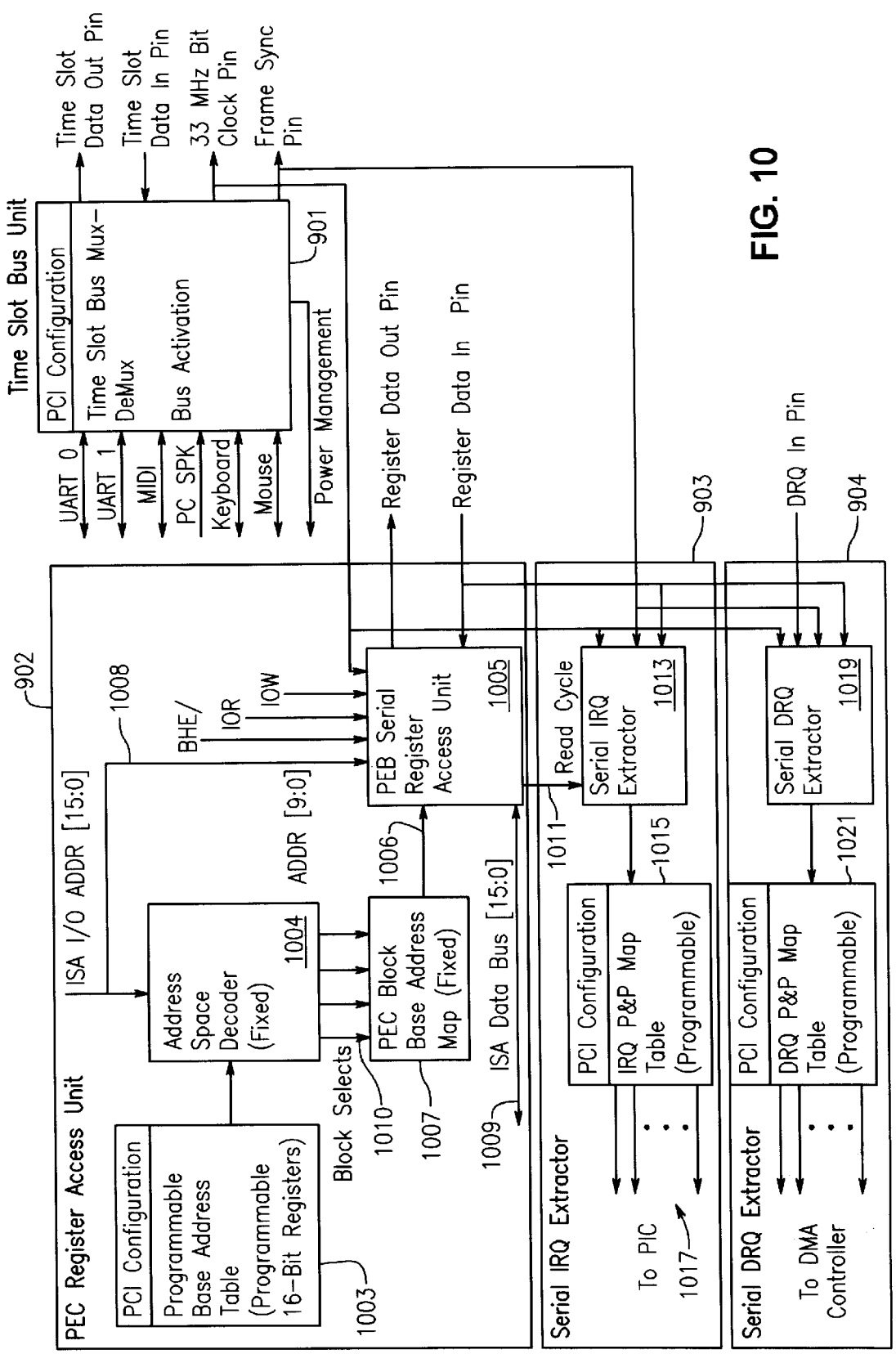
FIG. 10 shows a more detailed block diagram of the host controller shown in FIG. 9.

The block diagram of FIG. 9 is shown in greater detail in FIG. 10. The time slot bus unit 901 is mapped into PCI configuration address space. Various functions on the PCI bus are mapped into configuration space as is known in the art. Block 901 provides for bus activation from an inactive state as described further herein, as well as the multiplexing-demultiplexing function. Signals to and from UARTs 316, the mouse port and keyboard controller 314, and the PIT (PC speaker output) 304 are reflected across the PEB. The time slot bus unit multiplexes the outgoing signals onto the time slot data out pin and demultiplexes the incoming signals from the time slot data in pin.

The PEB also provides for an activation function which is recognized by logic in the time slot bus unit 901. The PEB activation function provides for a PEC initiated restart from a power down condition. Assume for example that the PC is in a reduced power state with the clocks stopped. The PEC would want to wake up the South Bridge if there were activity on e.g., the control pins of a COM port, say the Ring Indicate pin. Such activity should wake up the South Bridge from its sleep mode. The wakeup can be accomplished by the port expansion circuit requesting that the South Bridge start up the bus clocks (Bit Clock and Frame Sync). Those clocks are preferably stopped when the computer system enters sleep state to reduce power consumption.

Figure 11:
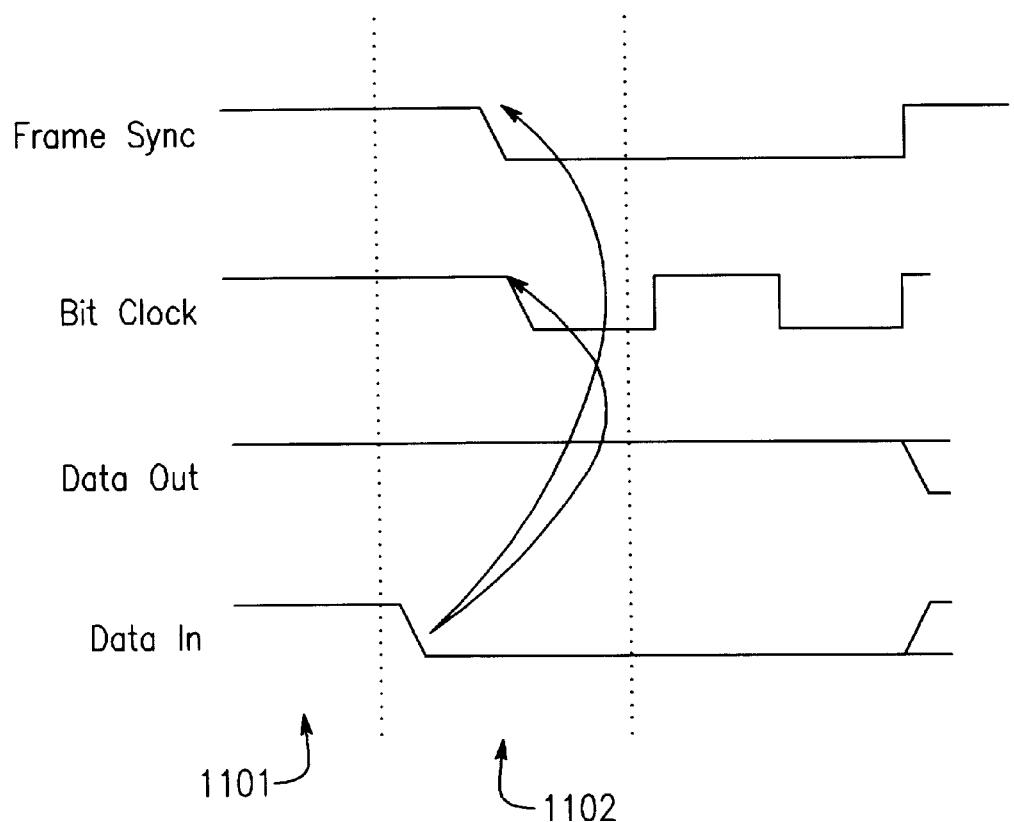
FIG. 11 is a timing diagram illustrating restarting of the port expansion bus from a power-down condition.

Referring to FIG. 11, when the bus is stopped to reduce power consumption as shown at region 1101, all of the lines on the port expansion bus are kept at a high voltage level in this embodiment. The port expansion circuit can request that the bus be restarted by pulling the time slot data in signal low as shown at 1102. The time slot data in signal is an output from the port expansion circuit to the South Bridge. The data in pin should be held low until frame sync goes low. Frame sync must go low for at least one bit time before it can go high (signifying the start of a frame). Note that while the protocol for waking up the South Bridge has been described with respect to specific polarities, other polarities can also be used depending upon the choice for indicating assertion of a signal.

The PEC register access unit 902 is also shown in more detail in FIG. 10. The PEC register access unit 902 includes the programmable base address table 1003. The table is mapped into the PCI configuration space. The table 1003 is a programmable table of registers with the 16-bit base address for each of the functions located with the PEC. These base addresses are matched (decoded) in address space decoder 1004 with the ISA I/O address from ISA bus 324 to create block selects 1010. The block selects 1010 cause the correct base address (which can be hardwired in the PEC) which is stored in the PEC block base address map 1007, to be presented to the PEB serial register access unit 1005 where the actual serial register access cycle is started in accordance with the timing diagram shown in FIG. 7. Note that the ISA data bus 1009 and ISA bus address 1008 and control signals BHE/, IOR and IOW are provided to the PEB serial register access unit 1005. Thus, for instance, if a device in the PEC has an address space of 16 bytes, e.g., the floppy controller, some of the high order address bits of the 10 address bits provided from the ISA bus to the PEB serial access unit 1005 may be replaced to indicate the correct address as hardwired in the PEC.

The serial IRQ extractor and P&P mapping table 903 is shown in more detail in FIG. 10. The serial IRQ extractor gathers IRQ data from the register data in pin during the address portion of each read cycle (717 in FIG. 7) and synchronous with frame sync during both a write cycle and when the bus is idle, based on the time slot assignments (723 in FIG. 7), relative to the start bit or the frame sync as appropriate. Read cycle indication 1011 is provided from register access unit 1005. Frame sync is also provided to the serial IRQ extractor 1013. Once the IRQ data has been gathered, it is provided to IRQ P&P mapper 1015. IRQ P&P mapper 1015 routes each of the five IRQ signals to software programmable destinations on the programmable interrupt controller 308. Note the mapper function may be located physically as part of interrupt controller 308. For legacy reasons, certain fixed interrupt mappings may be preferred. Specifically, the real time clock (RTC) 367 is preferably assigned IRQ8 and the floppy disk controller 357 is preferably assigned IRQ6. In the disclosed embodiment, one IRQ is provided from each of the floppy disk controller, parallel port, RTC, game port and general I/O blocks. Since the parallel port 353 can be assigned as either port 1 or port 2, using IRQ7 and IRQ5, respectively, the parallel port IRQ is software mappable. The game port and general purpose I/O IRQs are also software mapped. The programmed and/or fixed interrupts 1017 are then provided to the programmable interrupt controller 308.

Figure 12:
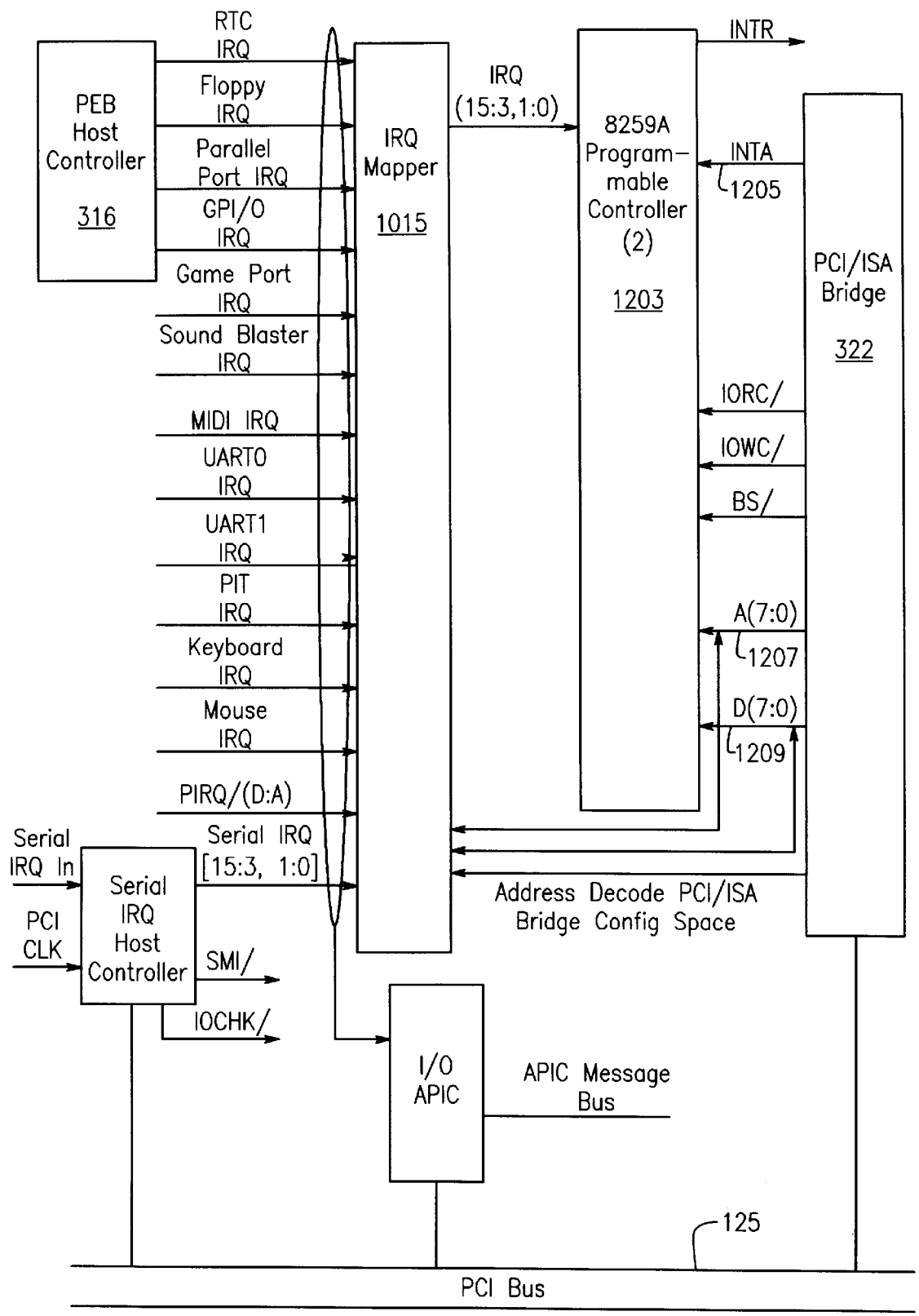
FIG. 12 is a block diagram of the interrupt control logic in the South Bridge.

Referring to FIG. 12, the IRQ mapper 1015 and the programmable interrupt controller (PIC) 308 (shown as 1203) are shown in a more detailed block diagram. The PIC 1203 in the embodiment shown includes two 8259A compatible PICs. The five IRQs from PEB host controller 316 are provided to the IRQ mapper 1015 which in turn are mapped according to the IRQ programmable table and provided to PIC 1203. The interrupt sequence using 8259A PICs is known in the art and is only briefly described herein. When an asserted interrupt is received over the register data in pin and extracted by the serial IRQ extractor 1013, it is mapped as according to the programmable mapping table and provided to the PIC 1203. Of course, unasserted interrupts are provided in manner to indicate their state. The asserted interrupt causes a bit corresponding to the interrupt in the PIC 1203 interrupt request register (IRR) to be set which in turns results in the CPU 110 being notified in a manner known in the art. The CPU acknowledges the interrupt with an interrupt acknowledge (INTA) command via PCI bus 125 which is provided as signal 1205 to PIC 1203. The INTA command resets the IRR bit and sets the corresponding bit in the interrupt service register (ISR) indicating that particular interrupt is currently being serviced by the CPU. When the CPU finishes servicing the interrupt, the CPU sends an end of interrupt (EOI) command which clears the ISR bit, thereby indicating that the processor has completed servicing that interrupt.

However, the processor is typically operating significantly faster than the relatively slow PEB supplying the IRQs. The maximum latency between updated IRQs (approximately 25 bit times) occurs during register read operations and is approximately 379 nanoseconds. The minimum latency is eight bit times (for five IRQs) when the IRQs are being provided as shown in Table 2. Because of the potential for a relatively long latency, the IRQ signals may not have been updated before the PIC 1203 receives the EOI command. Thus, the PIC may erroneously recognize the same interrupt twice.

In order to prevent an erroneous level triggered interrupt due to latency, the interrupt controller 1203 does not reevaluate its IRQ inputs until the IRQ transmission following the End Of Interrupt command (EOI) from the CPU to the PIC. That can be accomplished in several ways. In one embodiment, receipt of the EOI command coming across PCI/ISA bridge 322 is blocked in the Southbridge before it is provided to PIC 1203. The EOI command is then provided to the PIC after an updated IRQ is sent by serial IRQ extractor 1013 after the EOI command has been transmitted through the PCI/ISA bridge 322. That approach has the advantage of avoiding modifying the internal PIC logic but stalls the CPU since the bus transaction did not complete. The EOI command comes across address and data lines 1207 and 1209. Alternatively, instead of blocking the EOI command externally to the PIC, the EOI command is blocked internally to the PIC until after the updated IRQs are received.

Figure 13:
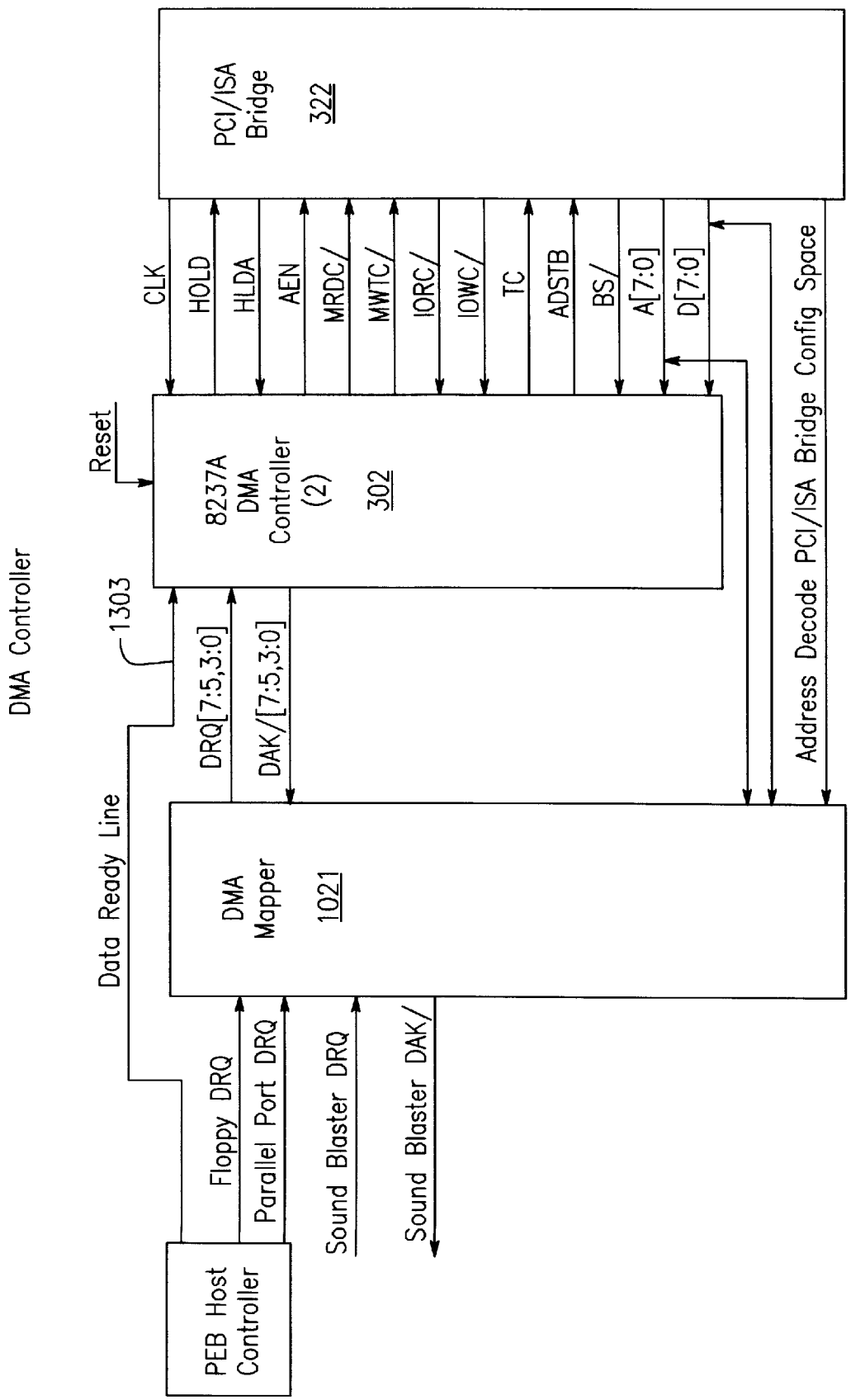
FIG. 13 is a block diagram of the DMA control logic in the South Bridge.

Referring again to FIG. 10, the serial DRQ extractor and P&P mapping table 904 is shown in more detail. Serial DRQ extractor 1019 receives data from the DRQ in pin, and extracts the floppy and parallel port DRQs from the bit stream based on the time slot assignments. The state of the two DRQ signals is being updated in the described embodiment at a rate of seven times per frame. Referring to FIG. 13, the extracted DRQ signals are sent to the DRQ Plug & Play mapper 1021 where they are programmably routed to the desired DRQ input on the DMA controllers. For legacy reasons, the floppy DRQ is preferably assigned to DRQ2. Thus, for this particular embodiment, only the parallel port DRQ is programmably mapped. The DMA mapper 1021 also receives a SOUND BLASTER DRQ and provides a SOUND BLASTER DAK/(DMA acknowledge) signal. The mapped DMAs are provided to DMA controller 302 which in the embodiment shown is two 8237A DMA controllers. The DMA controller interfaces with the PCI/ISA bridge 322.

Note that the mapper function 1021 may be located with the DMA controller 302 as part of an overall DMA P & P mapper.

Because of the latency between the start of a DMA generated register access to one of the ISA resident memory locations in the PEC and the update of the DRQ signals (up to approximately 530 ns for a 16 bit transfer(assuming 35 clocks for the transfer)), the DMA controller should not reevaluate its DRQ inputs until after the DRQ transmission after a DMA cycle. That can be implemented by holding the data ready line 1303 inactive.

Figure 14:
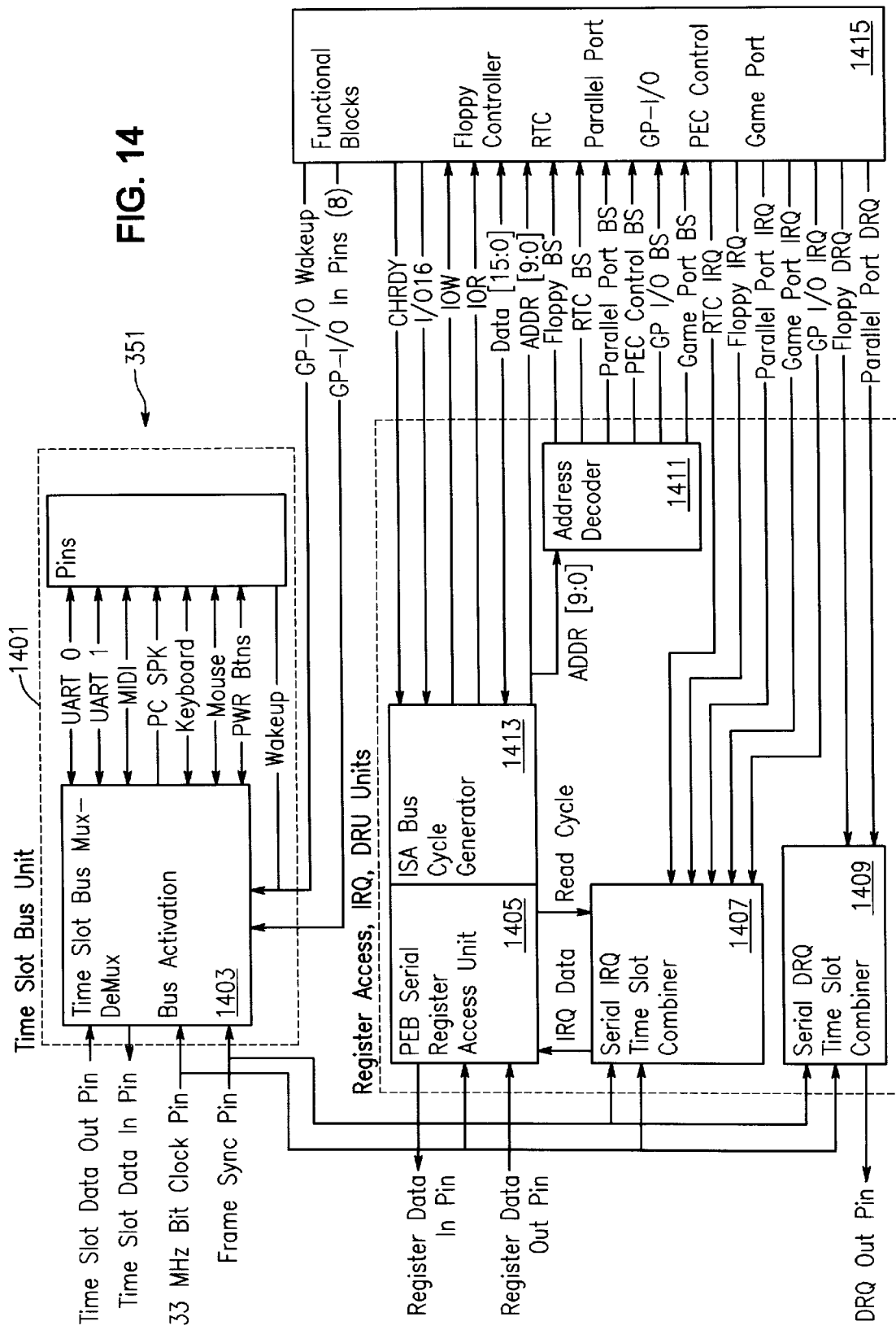
FIG. 14 is a block diagram of the port expansion integrated circuit.

Referring to FIG. 14, a more detailed block diagram of the PEC is shown. Time slot bus unit 1401 interfaces to the time slot bus, receiving data from the time slot data out pin, the bit clock, the frame sync, and provides time slot data in. Block 1403 provides a multiplexing-demultiplexing function to demultiplex data bits received from the PIT 304, keyboard/mouse controller 314, MIDI controller 310, and the serial port(s) 316 and provide the received signals to their respective pins. Block 1401 also receives serial port data (UART0 and UART 1), MIDI data, keyboard and mouse data and multiplexes those signals along with power buttons, and wakeup and general purpose I/O pins onto the time slot data in signal line. The time slot bus unit also provides the bus activation logic resulting in the assertion of the time slot data in signal as shown in FIG. 11, on receipt of a signal that causes a wakeup condition.

The PEC also includes PEB serial register access unit 1405 which receives the bit clock and the register data in signal and provides the register data out signal. The register access unit 1405, responds to the start bit as shown in FIG. 7. The register access unit determines whether the access is a read or write according to the read/write bit 703 and the size of the access according to the data size bit 705 indicating an 8 or 16 bit access. That information, along with the address (and data if the operation is a write operation) is provided to ISA bus cycle generator 1413 which generates an internal PEC ISA bus cycle to recreate a representation of the ISA bus in the PEC. Note that it may be not the same ISA representation as in the South Bridge. For example, the PEC ISA representation in the embodiment shown has fewer address lines. The 10 bits of address information is also provided to address decoder 1411 which decodes the 1 k address space into block selects for the various functional blocks 1415. The functional blocks may include the floppy controller, RTC, parallel port, PEC control register(s), GP I/O and the game port.

The ISA bus cycle generator 1013 provides the IOW (write) and IOR (read) signals along with the data bits and 10 bits of address. The ISA bus cycle receives the I/O16 signal line from the ISA resident logic blocks which indicates the size of the data being provided. The ISA cycle is built in accordance with FIG. 7. IOW/ is asserted at 710 with the leading edge of the bit clock synchronous with bit 0 of the data. IOW/ is deasserted at 712 at the falling edge of the bit clock starting the tenth bit for an 8 bit transfer and at 714 at the falling edge of the clock one bit time after the last data bit is transferred for a sixteen bit transfer as shown in FIG. 7.

For read operations, the functional blocks provide 8 or 16 bit data over the data lines to the ISA bus cycle generator 1413 to be transferred on the register data in line to the South Bridge. Read timing is shown in FIG. 7. IOR/ is asserted at 716 and deasserted at 718 following the receipt of the 10 bits of address data. Read data 713 and 715 is provided from one of the selected function blocks 1415 as shown in FIG. 7. Although the number of address bits shown in the embodiment is 10 bits, more or less bits may be provided depending upon the address range desired in the PEC. If the data cannot be provided during a read operation, then the start bit 731 is delayed until data is available.

The floppy controller, RTC, parallel port and game port are well known logic functions that will not be described further herein. The PEC control registers are mapped to the ISA to allow for read/write access to PEC control registers.

The PEC also includes serial IRQ time slot combiner 1407 which receives a read cycle indication form the PEB serial resister access unit 1405, the frame sync and the bit clock. The serial IRQ time slot combiner 1407 receives the RTC, floppy controller, parallel port, game port and GP I/O interrupt requests, and provides those interrupt requests to the PEB serial register access unit 1405 for multiplexing onto the register data in pin as described in relation to FIG. 7.

The PEC also includes serial DRQ time slot combiner 1409 which receives a the frame sync, bit clock and DMA requests from the floppy controller and parallel port. The serial DRQ time slot combiner 1409 provides those DMA interrupt requests to the South Bridge over the DRQ Out pin as described previously herein.

The port expansion circuit is pad-limited (meaning that the minimum size of the integrated circuit, as determined by the number of pins located around the outside edge of a square, is larger than the area necessary to contain the chip's logic). Thus, adding additional the function to the PEC produces little marginal cost increase and integration reduces motherboard chip count, board space, and cost.

Providing I/O capability for all the legacy devices as well as performing the bus interface and other functions on the South Bridge would require an integrated circuit with more I/O capability and would therefore could be a more expensive part. It is preferable to build an integrated circuit which can be more inexpensively packaged in, e.g., quad flat packs and avoid more expensive packaging such as ball grid arrays which can provide higher pin density but can also be more costly to produce. In many instances, reducing pin count significantly can reduce the package cost of the product.

Placing the legacy I/O terminals as well as some of the of the functional logic blocks (e.g., the game port, parallel port and floppy disk controller) in the PEC as described herein provides further advantages. As discussed, as process geometries shrink for faster and denser integrated circuits, e.g. channel lengths of 0.35 microns and below, supply voltages drop, e.g., to 3.3. volts or less, leading to problems driving the various devices on the I/O interface pins which are typically 5 volts. The legacy I/O interfaces tend to be 5 volts interfaces which is typical of the legacy devices. Since high speed is desired for the South Bridge integrated circuit, it is preferable to build the South Bridge chip with the smaller process geometries to provide a faster and denser chip. However, the port expansion circuit chip can be built with slow technologies, e.g., where the transistors have channel lengths of e.g., 0.5 microns or above. That allows the port expansion circuit to be built with older and less expensive process technology and also allows the port expansion circuit to easily interconnect to the 5 volts interfaces typical of the legacy devices. Additionally, slower logic functions such as the parallel port, floppy controller, and game port can be placed on the PEC, which is pad limited, meaning the size of the chip is determined by the number of I/O pins, not the amount of logic placed on the chip. Additionally, analog functions, such as those required for the game port can be more readily incorporated into older and more stable process technologies. At the same time, the more speed sensitive South Bridge can be built with the most up to date process technologies providing channel lengths for the transistors of the internal logic of, e.g., 0.35 microns, without the problem of interconnecting to a large number of 5 volts interfaces.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A computer system comprising:

first and second integrated circuits, said first integrated circuit including a first input/output bus operating according to a first protocol, said first input/output bus including a plurality of address lines and data lines respectively providing address and data information:

a plurality of functional blocks on said second integrated circuit, at least one of said functional blocks providing logic to interface to a legacy device;

a host controller circuit on said first integrated circuit coupled to said first input/output bus and for coupling to a register access bus including a register data out signal line and a register data in signal line, said register access bus connecting said first and second integrated circuits, said host controller circuit receiving said address and data information from said first input/output bus and serially providing said address and data information to said register data out line; and a target controller circuit on said second integrated circuit for coupling to said register access bus, said target controller circuit receiving said serially provided address and data information, said target controller circuit providing said address and data information over a second representation of said first input/output bus including a plurality of internal address lines and a plurality of internal data lines coupled to said functional blocks, said second representation including at least a subset of said first protocol of said first input/output bus, said address information identifying an address location within one of said functional blocks; and wherein said host controller circuit receives at least one of a read and write indication from said first input/output bus indicating respectively, a read operation and a write operation said indication being provided to said register data out line, wherein said read operation causes one of said functional blocks to provide read data to said target controller circuit over said internal data lines, said target controller circuit providing said read data serially to said register data in line and wherein said host controller circuit serially transmits a plurality of write data bits on the register data out line to the second integrated circuit for said write opinion, said write data bits being provided to one of said functional blocks over said internal data lines; and wherein said target controller circuit further provides an interrupt field to said register data in line, said interrupt request field including a first bit indicating the state of an interrupt request from one of said functional blocks.

2. The apparatus as recited in claim 1 wherein said first integrated circuit further comprises a plurality of additional functional blocks coupled to said first input/output bus, at least one of said additional functional blocks providing logic to interface to another legacy device through pins on said second integrated circuit.

3. The apparatus as recited in claim 4 wherein said interrupt request field is provided at a time synchronized to a periodic frame sync signal provided from said first integrated circuit, said frame sync signal being asynchronous with respect to register access operations across said register data in and data out lines.

4. The apparatus as recited in claim 3 wherein said interrupt request field includes a second interrupt request bit from a second of said functional blocks, said first and second interrupt request bits being provided at a time synchronous to said frame sync signal and wherein said first and second interrupt request bits are uniquely identified by their bit time relative to said frame sync signal.

5. The apparatus as recited in claim 4 wherein said interrupt request field further comprises a third and fourth interrupt request bits from third and fourth functional blocks respectively and wherein said functional blocks include at least one of a floppy disk controller, a parallel port and a game port.

6. The apparatus as recited in claim 1 wherein said target controller circuit includes a selecting circuit to multiplex an idle state and said interrupt request field onto said register data in line is when register accesses are not being performed.

7. The apparatus as recited in claim 6 wherein said selecting circuit further multiplexes an idle state and said interrupt request field onto said register data in line during a write operation.

8. The apparatus as recited in claim 1 wherein said interrupt request field is provided by said target control circuit a plurality of times during a frame, said frame being a predetermined number of data bits, a start of each said frame being indicated by a frame sync signal provided by said first integrated circuit.

9. The apparatus as recited in claim 1 wherein during a register read operation, said interrupt request field is provided in a predetermined time between a start bit time indicating when the register access bus becomes active and bit times for providing read data over the register data in line.

10. The apparatus recited in claim 1 wherein said target control circuit further provides a direct memory access (DMA) request field to a DMA request line coupled between said first and second integrated circuit, said DMA request field including a DMA request bit, indicating a state of a DMA request from one of said second functional blocks.

11. The apparatus as recited in claim 10 wherein said target control circuit provides said first DMA request field a plurality of times for each frame, said frame being a predetermined number of bit times, a start of each said frame being indicated by a frame sync signal, and wherein read and write operations across said register data in and register data out lines are asynchronous to said frame sync signal and wherein said first DMA request bit is provided in predetermined bit times during each said frame.

12. The apparatus as recited in claim 11 wherein said DMA request field further includes a second DMA request bit from another of said functional blocks, said one of said second functional blocks being one of a parallel port and a floppy disc interface.

13. The apparatus as recited in claim 1 wherein,
said host controller circuit serially provides first data to a time slot data out line coupled between said first and second integrated circuit, said first data including a predetermined number of first data bits, said first data including data bits representing a state of signals form said additional functional blocks to be provided on output terminals of said second integrated circuit; and wherein
said host controller circuit receives second data from a time slot data in line coupled between said first and second integrated circuits providing second data from said second to said first integrated circuit, said second data including data bits indicating a state of input terminals on the second integrated circuit.

14. The apparatus as recited in claim 1 wherein,
said target controller circuit serially receives first data from a time slot data out line coupled between said first and second integrated circuits, said first data including a predetermined number of first data bits, said first data including data bits representing a state of signals from said additional functional blocks to be output on output terminals of said second integrated circuit; and wherein
said target controller circuit provides second data to a time slot data in line coupled between said first and second integrated circuits, said second data including data bits indicating a state of input terminals of said second integrated circuit.

15. The apparatus in claim 1 wherein said apparatus further comprises:
a third integrated circuit coupled to said first integrated circuit via an external second input/output bus; and
a microprocessor coupled to said third integrated circuit, said microprocessor issuing read and write commands to said functional blocks located on said first integrated circuit via said third integrated circuit, said external second input/output bus, said first input/output bus, said register access bus and said second representation of said first input/output bus.

16. The apparatus as recited in claim 15 wherein said first input output bus is a representation of an industry standard architecture (ISA) bus and wherein said input/output bus is a Peripheral Component Interconnect (PCI) bus.

17. A method of operating a register transfer bus coupling a first and second integrated ciruits, said register transfer bus including a register data in line and a register data out line, comprising:
receiving a request in a host controller circuit located on said first integrated circuit, said host controller circuit interfacing to said register transfer bus, said request being for a register access operation, said register access operation being one of a read and write operation to an addressable location in said second integrated circuit, said request being provided to said host controller circuit according to a protocol of a first expansion bus located on said first integrated circuit, including providing address, data and read/write information according to said protocol;
serially transmitting a write address, said data and said read/write information to said second integrated circuit over said register data out line for said register write operation;
providing said address and data information according to at least a subset of said protocol to functional blocks in said second integrated circuit, to thereby provide said addressable location identified by said address information within one of said functional blocks, with said data information; and
providing a frame of interrupt data including at least one interrupt request bit on said register data in signal line when a register write operation takes place and when no register access operations are occurring on said register transfer bus, said at least one interrupt request bit indicating a state of an interrupt request from a first functional block located on the second integrated circuit.

18. The method as recited in claim 17 further comprising:
serially transmitting a read address, and read/write information to said second integrated circuit over said register data out line for said read operation;
recreating at least a portion of said read address in said second integrated circuit, and providing said portion of said read address according to said protocol; and
serially transmitting data from said addressable location identified by said read address over said register transfer data in line to said first integrated circuit.

19. The method as recited in claim 17 further comprising:
asserting a periodic frame sync signal on a frame sync signal line coupled between said first and second integrated circuits, said frame sync signal indicating a start of a frame, each frame containing a predetermined number of data bits; and
providing said frame of interrupt request data synchronous to said frame sync signal both when a register write operation takes place and when no register access operations are occurring, and wherein, said register access operations are asynchronous to said frame sync signal.

20. The method as recited in claim 19 further comprising providing frames including interrupt request bits substantially continuously to said first integrated circuit when the register data in line is in an idle state.

21. The method as recited in claim 20 wherein said interrupt request bit indicates a service request from one of a parallel port, a game port, and a real time clock (RTC).

22. The method as recited in claim 19 further comprising:
sending said frame of interrupt request data over said register data in line in a predetermined time during a register read operation between a start bit indicating when said register read operation begins and bit times for providing read data over the register data in line, said interrupt request data being sent during said register read operation independently of said frame sync signal.

23. A method as recited in claim 22 further comprising:
stopping transmission of said frame of interrupt request data by said second integrated circuit, when a register read operation starts during said transmission of said frame of interrupt request data being sent synchronous to said frame sync signal.

24. The method as recited in claim 19 further comprising:
providing a frame of time slot data out bits from the first integrated circuit to the second integrated circuit over a time slot data out line;
outputting respective ones of said time slot data out bits on respective output pins of said second integrated circuit according to a position of said time slot data out bits in each said frame;
providing a frame of time slot data in bits from the second integrated circuit to the first integrated circuit over a time slot data in line, a position in said frame indicating which of a plurality of input pins respective time slot data in bits originate; and
transferring said frames of said time slot data out and data in bits between said first and second integrated circuit.

25. The method as recited in claim 17 further comprising sending additional interrupt request bits each frame, each additional interrupt request bit indicating a state of interrupt requests from a respective plurality of additional functional blocks in said second integrated circuit.

26. The method as recited in claim 17 further comprising providing to a DMA request line at least one DMA request bit, said one DMA request bit indicating a state of a DMA request from a first functional block in the second integrated circuit to a DMA controller on the first integrated circuit.

27. The method as recited in claim 26 further comprising:
sending the at least one direct memory access (DMA) request bit multiple times each frame, each said frame being a predetermined number of bit times; and
asserting a frame sync signal periodically to indicate a start of said frame being indicated by a frame sync signal, said frame sync signal being independent of data transfers across said register data in and data out lines and wherein said at least one DMA request bit is sent in predetermined bit times during the frame.

28. The method as recited in claim 26 further comprising sending over the DMA request line a second DMA request bit from a second functional block in the second integrated circuit, the second functional block being one of a parallel port or floppy disc interface, the second DMA request bit being sent multiple times per frame and wherein the second DMA request bit is sent in predetermined bit times during the frame.

29. A method of operating a bus coupling a first and second integrated circuits, the bus including a clock line defining bit times, a register data in line, a register data out line, a frame sync line, a time slot data in line and a time slot data out line, the method comprising:
asserting a frame sync signal every predetermined number of bit times on the frame sync line, synchronous with the clock signal, the frame sync signal indicating the start of a frame, each frame containing a predetermined number of bit times;
transmitting data between the first and second integrated circuits in frames determined by the frame sync signal over the time slot data in and data out lines, said data in frames including data to and from input and output pins of said second integrated circuit;
asserting a start bit on the register data out line, thereby indicating the start of a register access operation, in response to the first integrated circuit receiving a read or write command, the read or write command originating with a processor and targeting one of a plurality of registers in the second integrated circuit, the register access operation being independent of the frame sync signal;
serially transmitting a plurality of address bits and a read/write bit indicating a read or write operation according to the read or write command to the second integrated circuit on the register data out line;
if a write operation is indicated, serially transmitting a plurality of write data bits on the register data out line to the second integrated circuit; and
transmitting at least one peripheral device service request over the register data in line synchronous with the frame sync signal during the write operation.

30. The method as recited in claim 29 further comprising:
if a read operation is indicated, sending at least one peripheral device service request bit over the register data in line from the second to the first integrated circuit in a predetermined bit time after receipt of the start bit, the at least one service request bit being sent independently of the frame sync signal; and
sending read data over the register data in line after sending the at least one request bit from the second to the first integrated circuit, the read data being provided by the location in the second integrated circuit indicated by the address bits.

31. The method as recited in claim 30 further comprising:
when a register access operation is not being performed and when a write operation is being performed, providing at least one peripheral device service request bit on the register data in signal line in predetermined time slots synchronous to the frame sync signal.

32. The method as recited in claim 31 further comprising:
when a register access operation is not being performed, maintaining the register data out line in an idle state, the idle state being a predetermined voltage level; and
multiplexing an idle state and at least one peripheral device service request bit onto the register data in line when the register write operation takes place and when the register data in line is in an idle state, the at least one peripheral device service request bit being provided synchronously to the frame sync signal, the at least one peripheral device service request bit indicating a state of a service request from a first functional block in the second integrated circuit.

33. The method as recited in claim 31 wherein the service request is one of a direct memory access request and an interrupt request.

34. A method of communicating from a first integrated circuit to a port expansion circuit, comprising:
sending and receiving input/output signals between the first integrated circuit and the port expansion circuit over a time slot data in and data out lines, said sending and receiving being synchronous to a frame sync signal;
detecting a write operation on a first input/output bus within said first integrated circuit, said write operation including address and data information and a write indication;

serially providing said address and data information on a register transfer data out line to said port expansion circuit;

providing said data information to a memory location in said port expansion circuit, said memory location being determined according to said address information;

detecting a read operation on said first input/output bus, said read operation including read address and a read indication;

serially providing said read address information on said register transfer data out line to said port expansion circuit;

serially providing data, obtained from an address location identified by said address information, from said port expansion circuit to said first integrated circuit over a register transfer data in line synchronously to said frame sync signal;

serially transferring interrupts from said functional blocks in said port expansion circuit over said register data in line synchronous with said frame sync signal; and serially transferring direct memory access (DMA) requests from said functional blocks in said port expansion circuit to said first integrated circuit over a DMA request line synchronous with said frame sync signal.

35. A computer system comprising a bus coupling first and second integrated circuits, comprising:

the bus including:
a clock line defining time slots;
a frame sync signal;
a first data portion including a time slot data in line providing data to the first integrated circuit and a time slot data out line providing data to the second integrated circuit, the first data portion transferring data over the time slot data in and time slot data out lines in frames, the frames being defined by the frame sync signal, each of the frames containing a plurality of time slots; and a second data portion including a register data in line providing data to the first integrated circuit and a register data out line providing data to the second integrated circuit, the second data portion transferring data over the register data in line during a first time period in a fixed relationship to the frame sync signal and during a second time period in a fixed relationship with a start bit transmitted over the register data out line independently of the frame sync signal.

36. The computer system as recited in claim 35 further comprising:

functional blocks on the second integrated circuit and wherein register access operations including read and write operations, are performed over the second data portion to registers located in the functional blocks during the second time period, in a fixed relationship with the start bit; and wherein during write operations and idle periods on the second data portion at least one peripheral device service request bit is provided in time slots in the fixed relationship to the sync signal and wherein during a read operation, at least one peripheral device service request is provided on the register data in line in the fixed relationship with the start bit.

* * * * *

UNITED STATES PATENT AND TRADEMARK OFFICE
CERTIFICATE OF CORRECTION

PATENT NO : 6,032,213
DATED : February 29, 2000
INVENTOR(S) : Dale E. Gulick

It is certified that error appears in the above-identified patent and that said Letters Patent are hereby corrected as shown below:

Title Page, [56] References Cited, replace "5,833,733 11/1998 Walsh et al." with --5,835,733 11/1998 Walsh et al--.

Col. 16, line 11, after "operation", insert --,--.

Col. 16, line 22, after "interrupt", insert --request--.

Col. 16, line 32, replace "claim 4" with --claim 1--.

Col. 17, line 29, replace "form" with --from--.

Col. 18, line 2, replace "ciruits" with --circuits--.

Col. 21, line 19, delete "said".

Signed and Sealed this

Tenth Day of April, 2001

*Attest:*

NICHOLAS P. GODICI

*Attesting Officer*     *Acting Director of the United States Patent and Trademark Office*